(12) United States Patent
Meskens et al.

(10) Patent No.: US 7,151,451 B2
(45) Date of Patent: Dec. 19, 2006

(54) NEAR FIELD PRESENCE DETECTION DEVICE

(75) Inventors: Werner Meskens, Brussels (BE); Carl Van Himbeeck, Brussels (BE)

(73) Assignee: Banksys S.A. (BE)

( * ) Notice: Subject to any disclaimer, the term of this patent is extended or adjusted under 35 U.S.C. 154(b) by 238 days.

(21) Appl. No.: 10/979,097

(22) Filed: Nov. 2, 2004

(65) Prior Publication Data
US 2005/0151645 A1    Jul. 14, 2005

(30) Foreign Application Priority Data
Nov. 5, 2003    (EP) .................................. 03078490

(51) Int. Cl.
*G08B 13/24* (2006.01)
(52) U.S. Cl. .................... 340/552; 340/5.41; 340/5.66; 902/1; 902/4; 902/5; 902/31
(58) Field of Classification Search ................ 340/552, 340/5.41, 5.66; 902/31, 1, 4, 5
See application file for complete search history.

(56) References Cited

U.S. PATENT DOCUMENTS 5,523,739 A *  6/1996  Manneschi .................. 340/552

6,390,367 B1   5/2002  Doig
6,422,475 B1   7/2002  May

FOREIGN PATENT DOCUMENTS

EP    1 043 704    10/2000

* cited by examiner

*Primary Examiner*—Jeffery Hofsass
*Assistant Examiner*—Samuel J Walk
(74) *Attorney, Agent, or Firm*—Akerman Senterfitt

(57) ABSTRACT

The invention relates to a near field presence detection device provided to monitor an area (11) around a mouth (2) of a reading member, in particular a card reading member (1). The device comprises a presence detector (3) including a transmitter (4) and a receiver (5), said detector is provided to detect a change of field impedance due to a foreign object in the area (11). The device is further provided to generate a preliminary alarm signal and an effective alarm signal if preliminary alarm signal subsists within a predetermined time period.

17 Claims, 3 Drawing Sheets

NEAR FIELD PRESENCE DETECTION DEVICE

CROSS-REFERENCE TO RELATED APPLICATIONS

This application claims priority from and is based on European Application No. 03078490.4 filed 5th Nov. 2003, the entirety of which is hereby incorporated by reference.

BACKGROUND OF THE INVENTION

This invention relates to a near field presence detection device provided for monitoring an area around a mouth of a reading member, in particular a card reading member, said device comprises a presence detector having a transmitter and a receiver, said transmitter and receiver being provided to operate with a carrier frequency above 18 KHz in said area, said detector being provided to detect a change of field impedance due to a foreign object placed within said area and to generate a detection signal thereupon, said detector being further provided to generate a preliminary alarm signal if a signal level of said detection signal generated by said detector exceeds a predetermined threshold range, said detector being connected to a verification unit provided for determining upon receipt of said preliminary alarm signal if said preliminary alarm signal subsists within a predetermined period $(t_2-t_1)$ and for producing an effective alarm signal if said preliminary alarm signal subsists within said predetermined period $(t_2-t_1)$, (from U.S. Pat. No. 6,390,367).

Such a detection device is known and for example used in automatic teller machines (ATMs). It is well known that ATMs are subjected to burglary attempts and attacks of various kinds aiming like skimming devices, Lebanese loops, etc.

ATMs are commonly and increasingly used to carry out many everyday transactions which do not require human supervision. As such transaction may involve transfer or dispense of valuable media, such as banknotes or payment orders, ATMs may present a target of fraud.

To make use of a conventional ATM, a user is first required to insert a card into the mouth of the card reader to the ATM fascia, the card serving as an identification token. The user must then confirm his or her identity by, for example, entering a personal code (PIN) associated with the card, but known only by the user and by the operative system. If an unauthorized individual wishes to gain access to an individual's account and thus to make unauthorized withdrawals of funds, it is necessary to both obtain the data stored on the card and gain knowledge of the appropriate personal code. Thus, potential targets for fraud include the card reader and the data input or capture device used for entry of the personal code. Methods which have been used in attempts to execute such fraud include fitting false interfaces to the fascia of an ATM in order to intercept the relevant data as it is being communicated to the ATM. For example, an additional magnetic card reader may be placed into, before or on the mouth of the existing card reader, so that the information stored on the magnetic strip of the card may be read, and consequently copied, as the card is inserted into the ATM. The thus intercepted data may then be used to construct a fraudulent card.

An other example of commonly used fraudulent device is the well known Lebanese loops which captures the original card of a user. A camera placed in a close proximity of the ATM registers the personal code input by the authorized user. When the transaction is ended, the user is not able to receive back his card. Generally the user does not worry about this card capture because he or she thinks about a defiance of the ATM. The defrauder has just to retrieve the card blocked in the ATM and read the personal code registered by the camera in order to get in his possession all the necessary data for using the magnetic card.

These fraud techniques are efficient because traditional sensors placed for protection of these ATMs against burglaries are too or not enough sensible to detect those fraud techniques.

The prior art describes fraud detection devices provided with sensors or means for producing a continuous alarm signal upon detection of a foreign object placed in or around the ATM. U.S. Pat. No. 4,514,623 discloses an ATM adapted to reject a foreign object introduced in the mouth. A blocking member prevents the transport of introduced objects and only enables such transport when sensors signal the presence of an object which meets established criteria. A drawback of this device is that it is unable to detect subtle fraud like Lebanese loops placed in the mouth in order to fraud the data of the user. The Lebanese loop will not be detected by the sensors since the loop is not presented to the sensors.

EP-A-0 965 960 discloses another protection device which comprises a loudspeaker and a microphone. The loudspeaker emits white noise which is picked up by the microphone. The detected signal constitutes an acoustic signature which changes if the ATM is tampered with, for example, by inserting some fraudulent mechanism into the ATM to intercept banknotes before they reach the output slot of the ATM. If any such change is detected then an alarm can be risen. This fraud detection system however presents a major drawback. Indeed, it is unusable because the detectors are too much sensible to background noise of the street, like talking people, car noises, advertiser noises, or climatic conditions like hard rain, grail and the like.

SUMMARY OF THE INVENTION

It is an object of the invention to realize a near field presence detection device which is more reliable and less sensible to environmental noises.

For this purpose the near field presence detection device according to this invention is characterized in that said detector is connected to an integrator, said integrator being provided for receiving said detection signal and for integrating said detection signal over a time period $\Delta t$ in order to obtain an integrated value $(\overline{V})$ for said detection signal, said verification unit comprising an input for receiving said integrated value and being provided for determining said threshold range on the basis of said integrated value.

The near field presence detection device according to the invention is indeed less sensible to the environmental noise because said device operates with a carrier frequency above 18 KHz, so that a major part of the environmental noise, which is below this frequency, is not taken into account by the detector and will therefore not perturb the functioning of the latter. The near field presence detection device of the invention is also more reliable because the detector is designed to detect a change in field impedance in the monitored area and because the device verifies within a predetermined time period $(t_2-t_1)$ if the alarm situation maintains and only releases an effective alarm signal if the alarm situation subsists. Consequently the introduction of a bank card will not generate an effective alarm as the time needed to introduce the card will be less than the predetermined period. Moreover, The use of an integrator not only enables to determine the integrated value $\bar{V}$, but also to take into account environmental changes such as grail, rain, temperature fluctuations and the like. As those environmental changes will affect the value of the field impedance, they will unavoidably affect the value of the detected signal. In order to avoid that those environmental changes would trigger a preliminary and even an effective alarm signal, the integrated value $\bar{V}$ is supplied to the comparator in order to be regularly updated. Since the integrator always integrates over a time period $\Delta t$ preceding the actual period, the integrated value $\bar{V}$ reflects the actual value of the field impedance called "Z characteristic".

A first embodiment of a device according to the invention is characterized in that the detection device is provided with a transmitter generating a modulated wave on the carrier, the frequency carrier being about 40 KHz. The modulated wave generated by the transmitter allows to ensure that the generated electromagnetic field can practically not be defrauded. Since it is very difficult to know the carrier frequency and the modulation in advance, the defrauder will not be able to manipulate the signals of the detector.

BRIEF DESCRIPTION OF THE DRAWINGS

Further objects and advantages of the present invention will be apparent from the following description, references being added to the accompanying drawings, wherein preferred embodiments of the present invention are shown and explained in more details. In the drawings.

Figure 1:
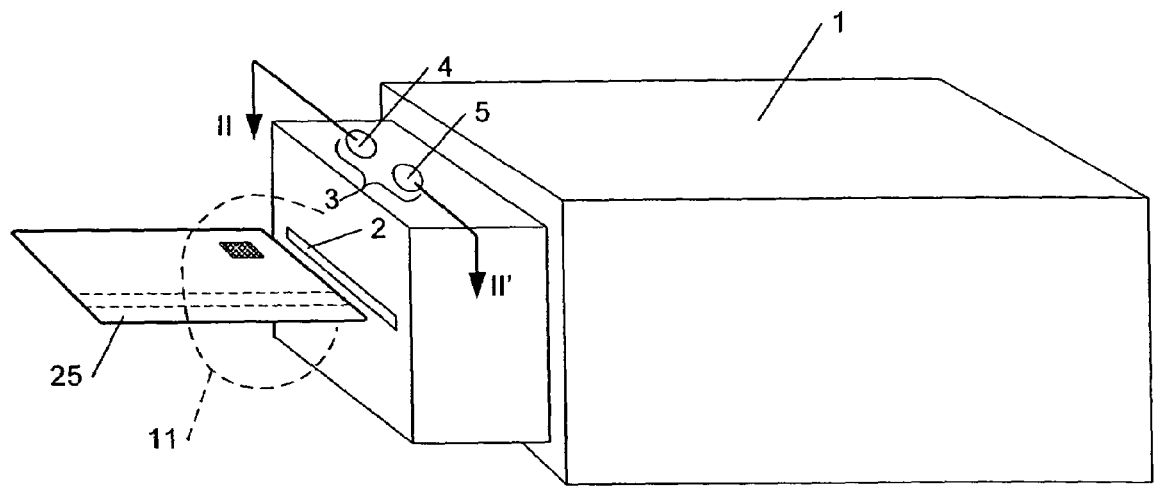
FIG. 1 is an overall view of a typical card reader.

In the drawings a same reference sign has been allotted to a same or analogous element.

DETAILED DESCRIPTION

Figure 3:
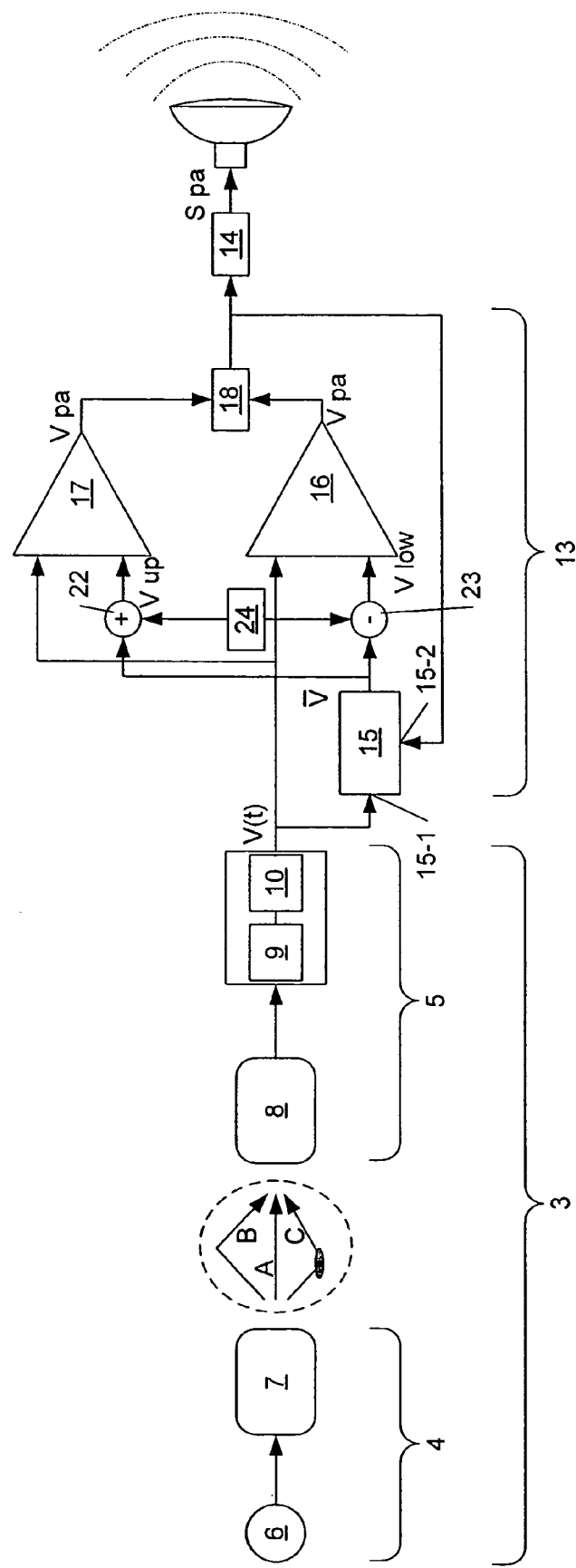
FIG. 3 is a block diagram of the near field presence detection device.

FIG. 1 shows a card reader (1) comprising in its front part a mouth (2) for the insertion of a user's card (25). Beyond the mouth (2), at least a transport mechanisms and a reading head (not shown) are housed for transporting and reading the card inserted into the reader. Transducer elements (3) are situated in the neighborhood of said card reader mouth. The transducer elements comprise a transmitter (4) and a receiver (5). As illustrated in FIG. 3, said transmitter (4) includes at least a generator (6) and a transducer (7). Said receiver (5) includes at least a tranducer (8), a band pass filter (9) and a sampling unit (10). Said transmitter (4) is provided to emit a signal in the form of a wave having a carrier frequency above 18 KHz, preferably around 40 KHz. The generated wave propagates in the volume corresponding to an area (11) to be monitored and will produce an electromagnetic field, in particular an ultrasonic field, in this area. A modulation could be applied on the carrier. The modulation can be either an amplitude or a frequency modulation. The application of a modulation enables to apply a signal which is more difficult to manipulate by an unauthorized user. If a modulation is applied on the carrier wave, the unauthorized user has to detect not only the frequency of the carder but also the type and value of the applied modulation. In view of large possible combination of carrier frequency and modulation, it becomes hard to detect the used signal. The generated field may also be an electrostatic field, a magnetic field and the like while the carrier frequency is above the background noise frequency, for example, above 18 KHz.

The impedance of the area in which the field is generated is called "Z characteristic". Z characteristic depends on the conformation, the materials of the device and the environment. The receiver (5), calibrated on the carrier frequency, detects the signal emitted by the transmitter. In a normal situation, the wave will propagate through the area and feel the impedance "Z characteristic". The receiver will consequently receive a signal which has felt "Z characteristic"

Figure 2:
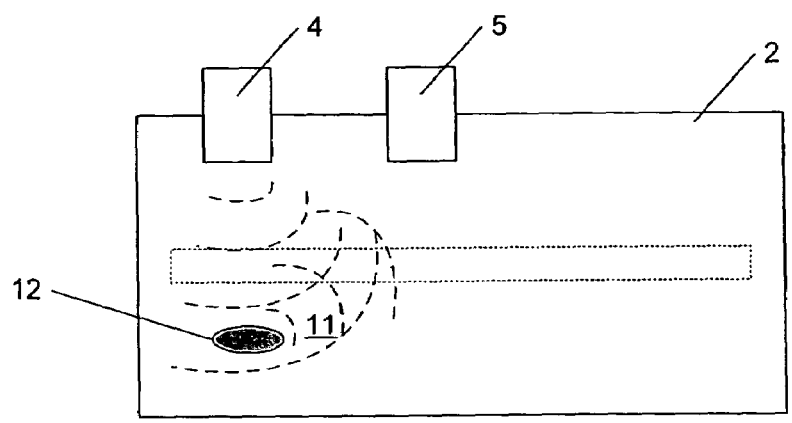
FIG. 2 shows a cross-section along line II–II' of FIG. 1.

FIG. 2 shows the propagation of an ultrasonic wave generated by the transmitter (4) when a foreign object (12) is present in the area (11). The presence of a foreign object (12) in the area, such as an additional card reading head placed before the mouth, will change the impedance of the area by an amount Z modified with respect to the environmental Z characteristic, thus leading to a resultant impedance Z resultant=Z characteristic+Z modified. As the receiver (5) will now receive a signal having propagated through the area (11) with an impedance "Z resultant", the received signal will have changed with respect to a signal having propagated through an area having Z characteristic as impedance. This change of the signal can now be used in order to detect the presence of a foreign object in the area (11).

The signals received by transducer (8) will pass the band pass filter 9 in order to retrieve from the received signals those having the carrier frequency. The band pass filter is connected to a sampling unit provided for sampling at a predetermined sample rate the filtered signal.

FIG. 3 shows a block diagram of the near field presence detection device showing the transducer elements (3), the verification unit (13) and the timer (14).

Figure 4:
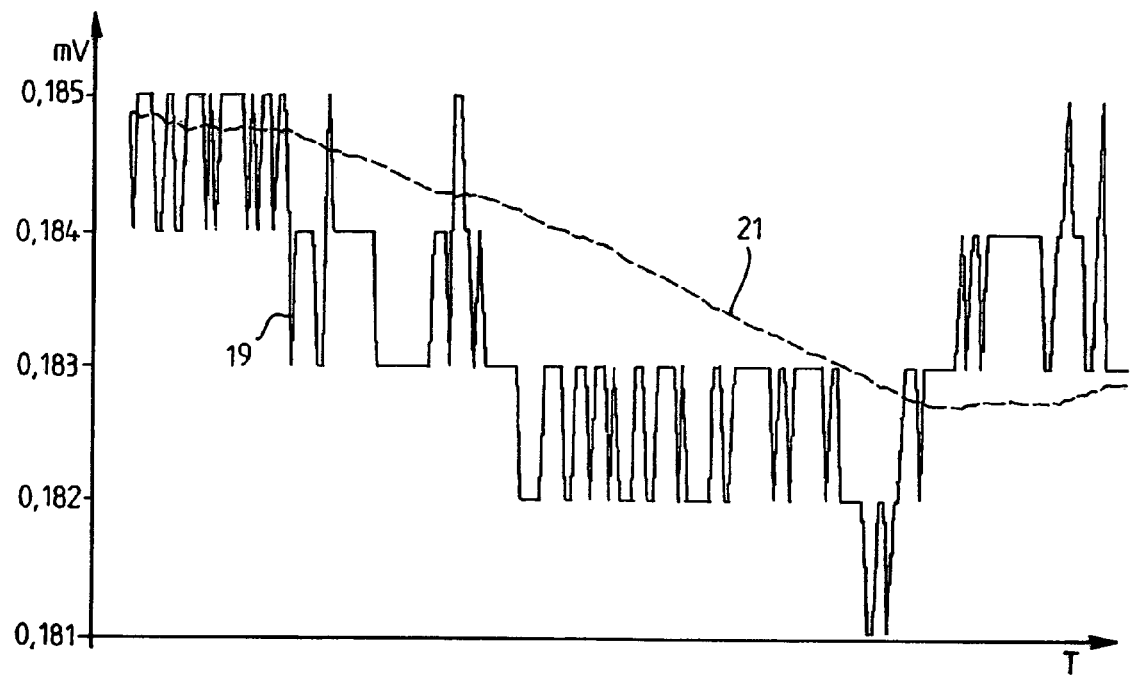
FIG. 4 shows an example of signals in a normal situation as generated by the ultrasonic transducers placed at the reader.

The verification unit comprises an integrator (15) and at least one comparator (16 et 17). Two comparators are preferably used in this embodiment, (16 et 17). The verification unit further comprises a logic member (18), for example formed by an OR-gate. The integrator (15) has a first input (15-1) for receiving sample signals V(t) supplied by the sampling unit (10). The integrator (15) buffers each time the signal V(t) (19) received during a time period $\Delta t$. The buffered signal are then integrated at an actual time t in order to form an integrated value $\bar{V}$ as shown in FIG. 4.

The integrator acts, as well known in the art, as an "averagor". The integrated value $\bar{V}$ is supplied to a substractor (23) and to an adder (22) which receives each at a further input a threshold value generated by the threshold unit (24). This is made in order to determine a range for the sampled values V(t) within which the device will not generate a preliminary alarm signal. This threshold value is in a preferred embodiment, for instance, 10 mV. Consequently, the adder (22) outputs an upper level (Vup) equals to $\bar{V}$+10 mV and the substractor (23) outputs a lower level (Vlow) equals to $\bar{V}$−10 mV. A first input of the comparator (17) or (16) receives respectively Vup and Vlow, whereas a second input of each comparator receives the sampled signal V(t). In a normal situation, as seen in FIG. 4, V(t) will remain within the range defined by Vup and Vlow, as V(t) only changes over a value less than 10 mV. Therefore, the comparator (17 or 16) will not output a signal to the logic member (18) and no preliminary alarm is generated.

The use of the integrator (15) not only enables to determine the integrated value $\bar{V}$, but also to take into account environmental changes such as grail, rain, temperature fluctuations and the like. As those environmental changes will affect the value of Z characteristic, they will unavoidably affect the value of V(t). In order to avoid that those environmental changes would trigger a preliminary and even an effective alarm signal, the integrated value $\overline{V}$ is updated. Since the integrator (15) always integrates over a time period Δt preceding the actual period, the integrated value $\overline{V}$ reflects the actual value of "Z characteristic". Furthermore, as the range $\overline{V}$±10 mV is determined on the basis of the actual value $\overline{V}$, the comparators (17) and (16) will always operate on an actual value of $\overline{V}$, thereby avoiding that environmental changes would trigger an alarm signal.

Figure 5:
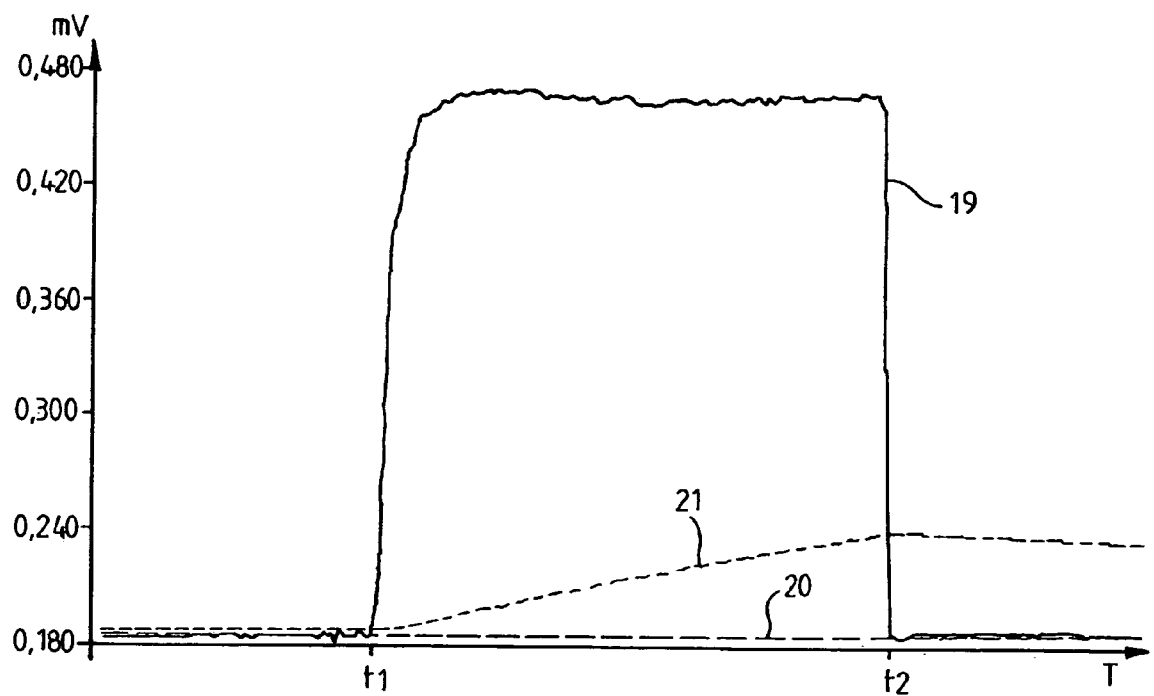
FIG. 5 shows an example of signals in a trouble situation as generated by the ultrasonic transducers placed at the reader.

Suppose now that a card is inserted into the mouth (2) of the card reader (1) at a time $t_1$. The card will contribute to a change of impedance by an amount Z modified. Consequently, as described herebefore, the receiver (5) will detect the modification leading to a change in the signal V(t). This is illustrated in FIG. 5 by the raising edge of signal V(t) (19) at time $t_1$. Please note that the scale used for V(t) in FIGS. 4 and 5 are not the same.

Since the signal V(t) (19) output by the receiver (5) is now higher than Vup, V(t)>Vup, the increase of the signal V(t) will cause the comparator (17) to output a signal "Vpa" to the logic member (18). Consequently "Vpa" will generate a preliminary alarm signal "Spa" supplied to a timer (14) and also to a control input (15-2) of the integrator (15). Upon receipt of Spa, the timer is triggered and starts to run.

The receipt of the "Spa" by the integrator (15) will cause the latter to no longer output the normal integration signal $\overline{V}$ (21 in FIG. 5) but to maintain the integrated value $\overline{V}$ (20 in FIG. 5) at the value $\overline{V}m$ it had just at the moment $t_1$ before the raising edge occurred. The adder (22) and the substractor (23) will thus produce a signal Vup and Vlow equals to $\overline{V}m$±10 mV. This is necessary because otherwise $\overline{V}$ would adapt itself to the increased value of V(t), thereby no longer detects an alarm situation.

This situation will subsist during the card insertion time. The card is however transported inside the card reader (1), and therefore, the impedance of the monitored area (11) will return to its normal value Z characteristic at a time $t_2$ corresponding with the moment at which the card is completely inside the reader. At $t_2$, the signal V(t) output by the receiver (5) will thus also return to its normal value as illustrated by the falling edge of signal (19) of FIG. 5.

This signal V(t), supplied to the comparators (17 or 16) now falls again within the range $\overline{V}m$±10 mV. This range, for memory, delimits the values within which the device will not generate a preliminary alarm signal. The comparators (17 or 16) will no longer output the signal Vpa as V(t)<$\overline{V}m$±10 mV. The timer (14) will be stopped and reset by the disappearance of Spa. No effective alarm signal will be generated because the insertion card time period ($t_2-t_1$) is shorter than the predetermined time period set by the timer (14) for an effective alarm signal generating. Because Spa is no longer actif, the control input of the integrator will no longer receive Spa. As there is no longer a signal present at the control input of the integrator (15), the integration will now again take the value V(t) into account and the device operates as in a normal situation.

It will be clear for those skilled in the art that the increase of the value of V(t) caused by the card insertion or other and leading to the raising edge is only given as example. The insertion of the card could also have caused a decrease of V(t), then leading to a falling edge instead of a raising edge. The signal Spa would then have been generated by comparator (16) instead of by comparator 17.

In a fraud situation, the operating concept is the same as the one described for a card insertion except that preliminary alarm situation will not be ended and that an effective alarm signal will be generated. Indeed as "Z resultant" remains equal to "Z characteristic"+"Z modified", the value of V(t) will remain outside the range $\overline{V}m$±10 mV. It will be interesting to note that the detector (3) detects any object, in particular fraudulent object inside, outside or around the mouth (2) of the card reader (1) in a range of about 15 cm. The fraudulent object (12) will create a change of impedance Z resultant corresponding to Z characteristic modified by said factor Z modified. As described herebefore, the receiver (5) will detect the modification leading to a change in the V(t). This is translated by a raising or a falling edge of signal V(t).

Since the signal V(t) output by the receiver (5) is supplied to the comparator (17), the increase or decrease of the signal V(t) will cause the comparator (17) or (16) to output to the logic member (18) the signal "Vpa". "Vpa" will first generate a preliminary alarm signal "Spa" supplied to the timer (14) and also to the control input (15-2) of the integrator (15). However, in this case, the alarm situation will subsist since the fraudulent object is still present. Spa will thus remain and the duration of Spa will exceed the predetermined time period of the timer, so that an effective alarm is generated.

The invention claimed is:

1. A near field presence detection device provided for monitoring an area around a mouth of a reading member, in particular a card reading member, said device comprises a presence detector having a transmitter and a receiver, said transmitter and receiver being provided to operate with a carrier frequency above 18 KHz in said area, said detector being provided to detect a change of field impedance due to a foreign object placed within said area and to generate a detection signal thereupon, said detector being further provided to generate a preliminary alarm signal if a signal level of said detection signal generated by said detector exceeds a predetermined threshold range, said detector being connected to a verification unit provided for determining upon receipt of said preliminary alarm signal if said preliminary alarm signal subsists within a predetermined period ($t_2-t_1$) and for producing an effective alarm signal if said preliminary alarm signal subsists within said predetermined period ($t_2-t_1$), characterized in that said detector is connected to an integrator, said integrator being provided for receiving said detection signal and for integrating said detection signal over a time period Δt in order to obtain an integrated value ($\overline{V}$) for said detection signal, said verification unit comprising an input for receiving said integrated value and being provided for determining said threshold range on the basis of said integrated value.

2. A detection device as claimed in claim 1, characterized in that said receiver comprises a sampling unit provided for sampling receipt signal, and wherein said integrator has an input for receiving sample signals supplied by said sampling unit, said integrator being provided for integrating a predetermined number of sample signals occurred during said predetermined time interval Δt preceding an actual time t.

3. A detection device as claimed in claim 2, characterized in that said transmitter includes a transducer, said transducer being an ultrasonic transducer and having a typical carrier frequency of about 40 KHz.

4. A detection device as claimed in claim 3, characterized in that said transmitter is provided for generating either an unmodulated or a modulated wave on said carrier.

5. A detection device as claimed in claim 2, characterized in that said transmitter is provided for generating either an unmodulated or a modulated wave on said carrier.

6. A detection device as claimed in claim 2, characterized in that said receiver comprises a selective bandpass filter provided for calibrating said receiver upon the carrier frequency.

7. A detection device as claimed in claim 2, characterized in that said verification unit comprises a timer, said timer being provided to be activated upon receipt of said preliminary alarm signal and de-activated and reset after each disappearance of said preliminary alarm signal, said timer being provided for generating said effective alarm signal upon exceeding a predetermined timeslot.

8. A detection device as claimed in claim 1, characterized in that said transmitter includes a transducer, said transducer being an ultrasonic transducer and having a typical carrier frequency of about 40 KHz.

9. A detection device as claimed in claim 8, characterized in that said transmitter is provided for generating either an unmodulated or a modulated wave on said carrier.

10. A detection device as claimed in claim 8, characterized in that said receiver comprises a selective bandpass filter provided for calibrating said receiver upon the carrier frequency.

11. A detection device as claimed in claim 8, characterized in that said verification unit comprises a timer, said timer being provided to be activated upon receipt of said preliminary alarm signal and de-activated and reset after each disappearance of said preliminary alarm signal, said timer being provided for generating said effective alarm signal upon exceeding a predetermined timeslot.

12. A detection device as claimed in claim 1, characterized in that said transmitter is provided for generating either an unmodulated or a modulated wave on said carrier.

13. A detection device as claimed in claim 12, characterized in that said receiver comprises a selective bandpass filter provided for calibrating said receiver upon the carrier frequency.

14. A detection device as claimed in claim 12, characterized in that said verification unit comprises a timer, said timer being provided to be activated upon receipt of said preliminary alarm signal and de-activated and reset after each disappearance of said preliminary alarm signal, said timer being provided for generating said effective alarm signal upon exceeding a predetermined timeslot.

15. A detection device as claimed in claim 1, characterized in that said receiver comprises a selective bandpass filter provided for calibrating said receiver upon the carrier frequency.

16. A detection device as claimed in claim 15, characterized in that said verification unit comprises a timer, said timer being provided to be activated upon receipt of said preliminary alarm signal and de-activated and reset after each disappearance of said preliminary alarm signal, said timer being provided for generating said effective alarm signal upon exceeding a predetermined timeslot.

17. A detection device as claimed in claim 1, characterized in that said verification unit comprises a timer, said timer being provided to be activated upon receipt of said preliminary alarm signal and de-activated and reset after each disappearance of said preliminary alarm signal, said timer being provided for generating said effective alarm signal upon exceeding a predetermined timeslot.

* * * * *